United States Patent [19]

Niemeyer

[11] Patent Number: 4,505,065
[45] Date of Patent: Mar. 19, 1985

[54] INSECT TRAP

[75] Inventor: Hans Niemeyer, Blankenhagen, Fed. Rep. of Germany

[73] Assignee: Niedersächsischer Minister für Ernährung, Landwirtschaft und Forsten, Hannover, Fed. Rep. of Germany

[21] Appl. No.: 516,345

[22] Filed: Jul. 22, 1983

[30] Foreign Application Priority Data

Aug. 20, 1982 [DE] Fed. Rep. of Germany ....... 3231232
Feb. 5, 1983 [DE] Fed. Rep. of Germany ....... 3303889

[51] Int. Cl.³ .............................................. A01M 1/10
[52] U.S. Cl. .......................................... 43/107; 43/122
[58] Field of Search .................................. 43/107, 122

[56] References Cited

U.S. PATENT DOCUMENTS

| 1,941,659 | 1/1934 | Coleman | 43/122 |
| 3,708,908 | 1/1973 | Levey | 43/122 |
| 3,743,718 | 7/1973 | Comeau | 43/107 |
| 4,442,624 | 4/1984 | Browne | 43/122 |

FOREIGN PATENT DOCUMENTS 2821378 11/1979 Fed. Rep. of Germany.
2924629 1/1981 Fed. Rep. of Germany.

Primary Examiner—Gene P. Crosby
Attorney, Agent, or Firm—Spencer & Frank

[57] ABSTRACT

An insect trap for catching flying forest insects, particularly bark beetles, has a hollow body adapted to accommodate an insect attractant and defined at least in part by a vertical wall structure; a plurality of distributed apertures provided in the wall structure; and a separate, flap-like projection associated with each aperture. Each projection extends from the lower edge of each aperture obliquely upwardly and away from the hollow body. Each projection has an upper surface oriented towards the wall structure and sloping downwardly towards the aperture associated therewith. Each upper surface has an abutment-free transition into the lower edge of the respective aperture. The trap further includes a collecting vessel supported by the hollow body at a lower portion thereof for collecting insects entering the hollow body through the apertures. The collecting vessel is covered by smooth, sloping surfaces guiding the insects to a one-way opening for admitting them into the collecting vessel.

19 Claims, 10 Drawing Figures

U.S. Patent     Mar. 19, 1985     4,505,065
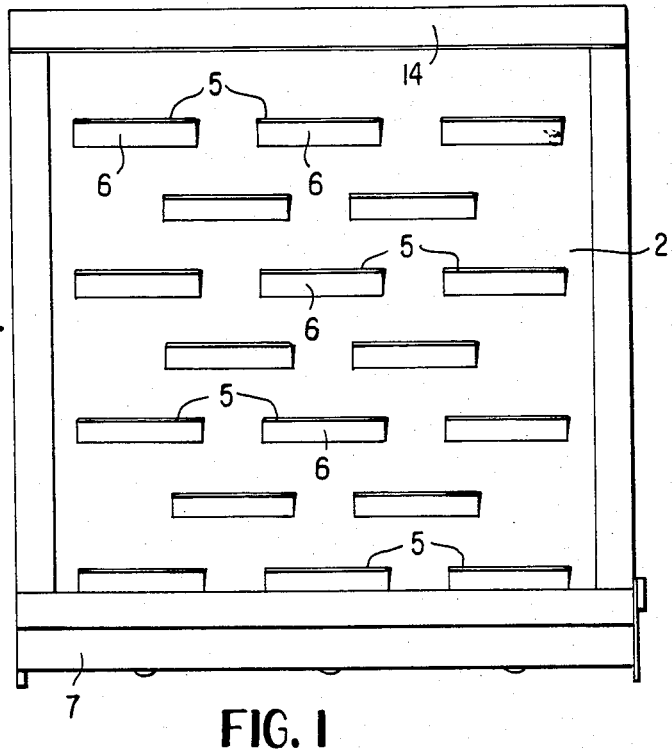
FIG. 1
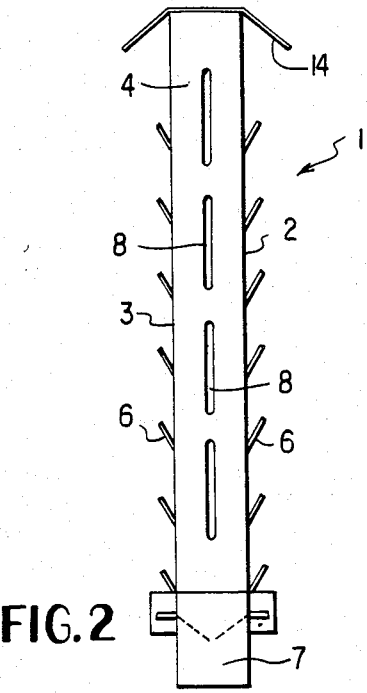
FIG. 2
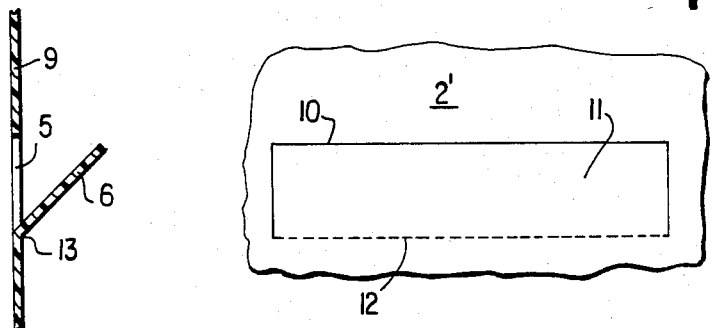
FIG. 3     FIG. 4
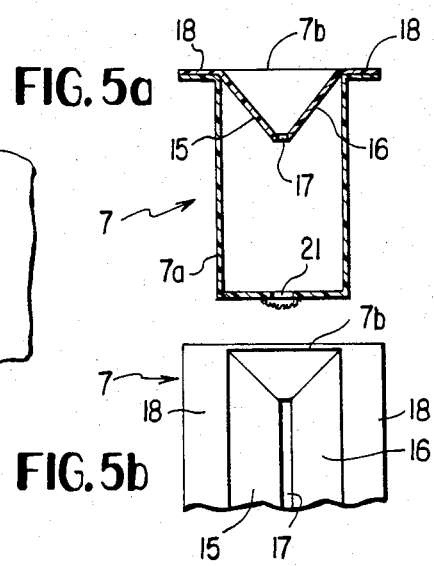
FIG. 5a
FIG. 5b
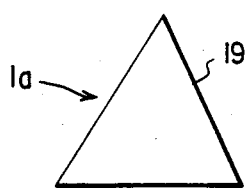   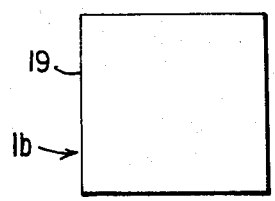   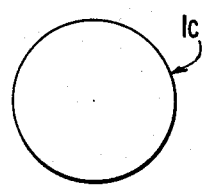   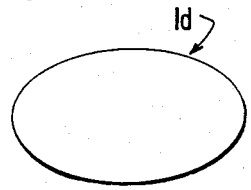
FIG. 6     FIG. 7     FIG. 8     FIG. 9

INSECT TRAP

BACKGROUND OF THE INVENTION

This invention relates to an apparatus for catching flying insects, particularly insects harmful in forests, such as bark beetles. The apparatus has a hollow body which, in use, has a substantially vertically oriented wall structure provided with a plurality of independent, spaced openings and a receptacle (dispenser) disposed in the hollow body and containing a volatile compound serving as an attractant.

Damage to forests caused by insects, particularly bark beetles is significant. Certain species of bark beetles kill evergreen trees, while others diminish the quality of cut wood stored in the forest. In the fight against bark beetles large volumes of cut evergreen wood are treated with poison to prevent breeding of the beetles in the logs or to destroy the offspring. Such poison, however, often destroys useful or harmless insects or other small animals whereby the ecological balance of the forest is adversely affected. In addition, laws concerning the protection of drinking water often significantly limit the use of poisons. Since the economic significance of bark beetles is expected to expand further inasmuch as industrial emissions (such as acid rain) make the trees more prone to insect attacks, a certain urgency is developing to find effective non-poisonous means to control the bark beetles.

More recently for certain insect species specific attractants (such as "pheromones", which are insect-produced volatile compounds attractive to both sexes in case of bark beetles) have been chemically identified and synthesized and it is sought to make use of such attractants particularly in traps adapted to the biology of the insect species.

The devices for catching bark beetles are usually divided into two types, such as "flight traps" and "landing traps". The principle of flight traps resides in that the insects, lured by the attractants collide "unintentionally" with a flight barrier invisible to them, then fall and are caught in some manner. The principle of landing traps resides in that the insects, lured by the attractant, "intentionally" land on the outer trap wall and run thereon until they have found an aperture through which they can pass. Then they have to crawl through the aperture into the trap, whereupon they fall directly into a collecting vessel positioned on the trap floor.

A flight trap for catching flying forest insects is disclosed, for example, in German Offenlegungsschrift (application published without examination) No. 2,924,629. The structure disclosed therein has two planar plates arranged at right angles which serve as collision surfaces or flight barriers. The plates are arranged on a funnel which has a smooth upper surface and which opens into a collecting vessel arranged therebelow. The collecting vessel accommodates a receptacle which contains the attractant. The beetles collide in flight with the plates which are invisible for them and fall—in case all components operate as intended—into the funnel and therefrom into the collecting vessel. In order to obtain satisfactory results with this type of insect trap, the surfaces of the plates as well as the funnel have to be sufficiently large. This results in the disadvantage that in addition to insects intended to be trapped, plant parts, other foreign bodies and sometimes even birds, drop into the funnel, so that its smooth surface is "roughened" by soiling. In early summer, particularly pollen is responsible for soiling the funnel surfaces. When the funnel surface loses its smoothness, the insects falling into the funnel do not slide into the collecting vessel, but are able to hold onto the funnel wall and frequently leave the trap and return to the woods. Because of the large funnel opening, rain, snow and wind also have a disadvantageous effect on the functioning of these types of traps. Thus, for the above-outlined reasons, this type of known trap is often in an inoperative condition.

A known landing trap is disclosed, for example, in German Offenlegungsschrift No. 2,821,378. The trap which has been designed particularly for bark beetles, has a hollow body which has a large number of passages situated on the top of the hollow body. The outer surface of the hollow body is roughened to permit the beetles to land and run thereon. The inner face of the hollow body is particularly smooth. The immediate vicinity of the passages on the inside of the hollow body is also roughened. Within the hollow body there is positioned a receptacle containing the attractant. It has been found that such a device is well adapted for catching bark beetles without endangering useful animals. By virtue of its particular shape, the trap is adapted precisely to the configuration of bark beetles while other forest insects cannot be trapped thereby or are only caught accidentally. Further, the known landing trap is significantly less efficient than flight traps because landing traps, as noted, set much higher "requirements" for the beetles.

SUMMARY OF THE INVENTION

It is an object of the invention to provide an improved insect trap for catching harmful flying forest insects which is of simple structure and of such a design that plant parts or other foreign bodies cannot adversely affect its operation and therefore the structure may function without maintenance.

This object and others to become apparent as the specification progresses, are accomplished by the invention, according to which, briefly stated, the insect trap for catching flying forest insects has a hollow body adapted to accommodate insect attractants and defined at least in part by a vertical wall structure; a plurality of distributed apertures provided in the wall structure; and a separate, flap-like projection associated with each aperture. Each projection extends from the lower edge of each aperture obliquely upwardly and away from the hollow body. Each projection has an upper surface oriented towards the wall structure and sloping downwardly towards the aperture associated therewith. Each upper surface has an abutment-free transition into the lower edge of the respective aperture. Thus, insects colliding with the wall structure, are caught, as they fall after the impact, by a projection and are guided by its upper surface into the hollow body through the associated aperture. The trap further includes a collecting vessel supported by the hollow body at a lower portion thereof for collecting insects entering the hollow body through the apertures. The collecting vessel is covered by smooth, sloping surfaces guiding the insects to a one-way opening for admitting them into the collecting vessel.

Since the trap according to the invention has no receiving funnel directly accessible from the outside, the trap may be set at any desired location in a forest without the risk of operational malfunctions because of soiling or clogging. The apertures through which the insects enter the hollow body are, as viewed from above, almost entirely covered by the projections which extend obliquely upwardly from the lower edge of the apertures. The risks that plant parts such as branches or leaves or other foreign articles enter the hollow body or block the passages are reduced to a minimum. The oblique surfaces of the projections may be of such a short length in the sliding direction of the insects that even pollen adhering to the projections cannot prevent the insects from sliding into the collecting vessel. Even if some of the passages are rendered useless by soiling, the operability of the entire trap as a whole is not appreciably affected because there always remains available a sufficient number of free (unclogged) passages through which the insects, after having collided with the hollow body, are guided into the inside of the hollow body and thus into the collecting vessel from which they cannot escape.

BRIEF DESCRIPTION OF THE DRAWING

FIG. 1 is a front elevational view of a preferred embodiment of the invention.

FIG. 2 is a side elevational view of the structure shown in FIG. 1.

FIG. 3 is a sectional side elevational view, on an enlarged scale, of a part of the structure shown in FIG. 2.

FIG. 4 is a fragmentary front elevational view, on an enlarged scale, of a blank for making one component of the structure shown in FIGS. 1 and 2.

FIG. 5a is a sectional side elevational view, on an enlarged scale, of a part of the structure shown in FIG. 2.

FIG. 5b is a fragmentary top plan view of the structure illustrated in FIG. 5a.

FIGS. 6, 7, 8 and 9 are top plan views of alternative outlines of the structure shown in FIGS. 1 and 2.

DESCRIPTION OF THE PREFERRED EMBODIMENTS

Turning now to FIGS. 1 and 2, there is illustrated an insect trap having a hollow body generally designated at 1 which is formed of two parallel vertical large sides 2 and 3 and two parallel narrow sides 4 which connect the sides 2 and 3 with one another. In the sides 2 and 3 there are provided a large number of apertures 5 from the lower edge of which there extends upwardly a flap-like projection 6. Underneath the sides 2 and 3 there is arranged a collecting vessel 7 whose structure is shown in more detail in FIG. 5. In the narrow sides 4, passages 8 may be provided for an improved ventilation and spreading of insect-attracting volatile compounds vapors from the hollow body 1. It is noted that words of orientation, such as "vertical", "horizontal", "upward", etc. are related to the trap and its components as positioned in normal use.

The apertures 5 are distributed over the entire height of the sides 2 and 3. The apertures 5 are each separate from one another and are preferably designed as longitudinal slots. The apertures 5 are advantageously distributed over the height of the lateral faces 2 and 3 such that the apertures arranged along one horizontal plane are aligned with gaps between apertures arranged along the overlying and underlying horizontal planes. Further, the apertures 5 of each aperture row along the different horizontal planes overlap (as viewed in a vertical projection) the apertures of the adjoining aperture rows. Thus, viewing the hollow body 1 from above, it appears as if a single projection 6 extends without interruption over the entire width of the sides 2 and 3. Thus, the insects colliding with the side wall 2 or 3 cannot drop vertically down beyond the trap externally of the hollow body but are caught by one of the projections 6 and are guided through the associated aperture 5 into the inside of the hollow body 1.

Turning now to FIG. 4 which is a fragmentary view of a blank 2' from which side wall 2 is made, each projection 6 and aperture 5 are produced, for example, by providing an inverted U-shaped slot 10 in the blank 2'. This results in a flap portion 11 which is bent outwardly out of the plane of the blank 2' along a line 12 which connects the free ends of the "U" and which is shown in broken lines in FIG. 4. By bending the flap portion 11 outwardly, the obliquely upwardly oriented projection 6 and, at the same time, the aperture 5 are produced in the wall structure 9 of the sides 2 and 3 as shown in FIG. 3. Thus, the projection 6 starts—without any abutment or ledge—at the lower edge 13 of the aperture 5 and extends obliquely outwardly and upwardly as related to the operational position of the hollow body 1. The highest point of the projection 6 is thus situated on the side oriented away from the wall 9. The insects falling on the upwardly oriented surface of the projection 6 slide directly through the associated aperture 5 into the hollow body 1.

It is to be understood that the projections 6 may be provided in any other desired manner in the wall of the hollow body 1 which may be provided with the apertures 5 previously, for example, by stamping. The shape of the apertures may also be freely selected. Care has to be taken that each projection 6 starts at the lower edge 13 of each aperture 5 and that a smooth sliding face of the projection 6 is obtained which is not interrupted by an abutment edge or other obstruction.

For the protection of the upwardly oriented surface of the projection 6, at the top of the hollow body 1 there is provided a roof 14 which extends over the projections 6. For facilitating a replacement of the attractant dispenser accommodated within the hollow body 1, the latter may be provided with a removable lid.

The insects which collide with the hollow body 1 and are guided in the inside thereof fall into a collecting vessel generally designated at 7. The latter is preferably a two-part construction formed of a trough-like container 7a and a removable top closure 7b. The container 7a and the top closure 7b have, on opposite sides, laterally projecting flanges 18 which function as rails for being slidably received by the hollow body at the bottom thereof. The top closure 7b includes inwardly inclined, converging, highly smooth walls 15 and 16 which at their respective lower end, together define a narrow opening (slot) 17. The insects drop through the opening 17 into the collecting vessel 7 from which they cannot escape. For draining rain water, the bottom of the container 7a is provided with apertures 21 which may be covered with a wire screen.

The flat hollow body 1 shown in FIGS. 1 and 2 is formed, for example, of a 50×50 cm plastic frame having 6 cm wide narrow sides 4. The two large sides 2 and 3 are inserted in the frame which may be formed, for example, of a 1-2 mm thick hyaline synthetic sheet material (such as polypropylene) stabilized against ultraviolet radiation. The apertures 5 are slots 10 cm long in the horizontal direction and 2 cm wide in the vertical direction. The collecting vessel 7 may be pushed into the frame and supported thereby by means of rails 18 mounted on the collecting vessel 7.

The hollow body 1 may be formed of disassemblable individual components to provide for a space-saving shipment and storage when the trap is not in use. Preferably, the hollow body 1 should be easily assemblable and disassemblable.

The embodiment of the hollow body 1 illustrated in FIGS. 1 and 2 represents a particularly advantageous design. In the operational position, the hollow body is, for example, suspended from a stand. As an alternative to the design with two large vertical walls 2 and 3, the hollow body 1a may have, for example, a triangular cross-sectional outline as illustrated in FIG. 6. In such a design the three side walls 19 are all provided with apertures and projections. The same applies in case of a rectangular (square) cross-sectional configuration of a hollow body 1b as illustrated in FIG. 7 or in case of any polygonal shape. In principle, the hollow body 1c may be circular as shown in FIG. 8 or elliptical as shown in FIG. 9 (hollow body 1d). It is to be understood that the collecting vessel should expediently be adpated to the particular cross-sectional outline of the hollow body. It is feasible to use more than one collecting vessel.

In each embodiment, a container (not shown for the sake of simplicity) provided with attractant is situated within the hollow body for attracting the forest insects. For attracting bark beetles, commercially available insect-specific pheromone is used.

It is further to be understood that the apertures 5 need not be interrupted in the horizontal direction; it is thus feasible to provide single horizontal apertures with associated projections which extend vertically spaced, parallel to one another along the entire width of the wall of the hollow body.

It will be understood that the above description of the present invention is susceptible to various modifications, changes and adaptations, and the same are intended to be comprehended within the meaning and range of equivalents of the appended claims.

What is claimed is:

1. A trap for catching flying insects, comprising:
   (a) a hollow body adapted to accommodate a dispenser with insect-specific attractant and defined at least in part by a wall structure oriented vertically during use;
   (b) a plurality of apertures provided in said wall structure and distributed substantially over the entire area thereof; each said aperture being bounded by a lower edge forming part of said wall structure;
   (c) a separate, flap-like projection associated with each said aperture; each projection being affixed to said wall structure and extending from each said lower edge obliquely upwardly and away from said hollow body; each said projection having an upper surface oriented towards said wall structure and sloping downwardly towards the aperture associated therewith; each said upper surface having an abutment-free transition into said lower edge of the respective aperture, whereby insects colliding with said wall structure and falling downward are guided by said upper surface into the inside of said hollow body through the associated aperture; and
   (d) at least one collecting vessel supported by said hollow body at a lower portion thereof for collecting insects entering said hollow body through said apertures; said collecting vessel being covered by smooth, sloping surfaces guiding the insects falling thereon after their passage into said hollow body; said sloping surfaces of said collecting vessel defining, at a lower portion thereof, a one-way opening for admitting insects into said collecting vessel.

2. A trap as defined in claim 1, wherein said apertures and said projections associated therewith are arranged in a plurality of horizontal rows spaced vertically from one another; the apertures and associated projections of each row being horizontally spaced from one another to define gaps among themselves; said apertures and associated projections of any selected row being aligned, as viewed vertically, with respective said gaps of rows immediately adjoining said selected row.

3. A trap as defined in claim 2, wherein said apertures and associated projections of any selected row overlap, as viewed vertically, respective said apertures and associated projections of rows immediately adjoining said selected row.

4. A trap as defined in claim 1, wherein said hollow body has a polygonal cross-sectional outline.

5. A trap as defined in claim 1, wherein said hollow body has a rectangular cross-sectional outline; said wall structure being formed of two parallel, oppositely-located large sides connected to one another by two parallel, oppositely-located small sides.

6. A trap as defined in claim 5, further comprising a plurality of openings provided in said small sides.

7. A trap as defined in claim 1, wherein said hollow body has a circular cross-sectional outline.

8. A trap as defined in claim 1, wherein said hollow body has an elliptical cross-sectional outline.

9. A trap as defined in claim 1, wherein said hollow body has a top side as viewed when in use; said top side being closed.

10. A trap as defined in claim 9, further comprising lid means closing said top side.

11. A trap as defined in claim 10, wherein said lid means comprises a roof-like construction extending from said hollow body beyond said projections.

12. A trap as defined in claim 1, wherein said hollow body comprises assemblable and disassemblable components.

13. A trap as defined in claim 1, wherein said apertures are slots having a length oriented horizontally as viewed in use.

14. A trap as defined in claim 1, wherein each projection is a bent-out part of said wall structure and each aperture is constituted by a discontinuity left in said wall structure by the respective bent-out part.

15. A trap as defined in claim 1, wherein said collecting vessel is readily removable from and insertable into said hollow body.

16. A trap as defined in claim 1, further comprising rail means for guiding said collecting vessel in said hollow body.

17. A trap a defined in claim 1, wherein said sloping surfaces covering said collecting vessel form a part of said hollow body.

18. A trap as defined in claim 1, wherein said wall structure is a hyaline synthetic material.

19. A trap as defined in claim 1, wherein said hollow body has a top side as viewed when in use; further comprising a roof-like construction arranged on said top side and extending from said hollow body beyond said projections.

* * * * *